US008831217B2

(12) United States Patent
Blankenbeckler et al.

(10) Patent No.: US 8,831,217 B2
(45) **Date of Patent: *Sep. 9, 2014**

(54) DIGITAL RIGHTS MANAGEMENT SYSTEM AND METHODS FOR ACCESSING CONTENT FROM AN INTELLIGENT STORAGE

(75) Inventors: David L. Blankenbeckler, Longmont, CO (US); Danny Ybarra, Mission Viejo, CA (US); Lambertus Hesselink, Atherton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,616

(22) Filed: Apr. 30, 2012

(65) Prior Publication Data

US 2013/0268771 A1 Oct. 10, 2013

Related U.S. Application Data

(60) Provisional application No. 61/622,312, filed on Apr. 10, 2012.

(51) Int. Cl.

| | |
|---|---|
| ***H04N 7/167*** | (2011.01) |
| ***G06F 12/14*** | (2006.01) |
| ***G06F 7/04*** | (2006.01) |
| ***G06F 21/00*** | (2013.01) |
| ***G11B 20/00*** | (2006.01) |
| ***G06F 21/71*** | (2013.01) |
| ***G06F 21/10*** | (2013.01) |

(52) U.S. Cl.

CPC .... *G11B 20/00115* (2013.01); *G11B 20/00123* (2013.01); *G11B 20/00137* (2013.01); *G11B 20/00246* (2013.01); *G06F 21/71* (2013.01); *G06F 21/10* (2013.01); *G06F 2221/2107* (2013.01)

USPC ............ 380/201; 380/202; 713/189; 726/26; 705/57

(58) Field of Classification Search

CPC .................. G11B 20/00115; G11B 20/00123; G11B 20/00137; G11B 20/00246; G06F 21/71; G06F 21/10; G06F 2221/2107

USPC ........ 713/189; 380/201, 202; 726/26; 705/57

See application file for complete search history.

(56) References Cited

U.S. PATENT DOCUMENTS

| | | | |
|---|---|---|---|
| 6,205,550 | B1 | 3/2001 | Nardone et al. |
| 6,609,199 | B1 | 8/2003 | DeTreville |

(Continued)

OTHER PUBLICATIONS

U.S. Appl. No. 13/460,604, filed Apr. 30, 2012; David L. Blankenbeckler etal., 40 pages.

(Continued)

*Primary Examiner* — Aravind Moorthy

(57) ABSTRACT

The present invention relates to accessing content stored on a storage device and protecting the content with a digital rights management (DRM) scheme. The storage device may be a disk drive, or network attached storage. The storage device can perform cryptographic operations and provide a hardware root of trust. The DRM employs a binding key, a content key, and an access key. The binding key binds the content to the storage device and is based on a key concealed on the storage device. The binding key itself is not stored anywhere on the storage device. The content key is a key assigned to the content. The access key is determined based on a cryptographic combination of the content key and binding key. In one embodiment, the content is encrypted based on the access key and stored in encrypted form in the storage device.

22 Claims, 8 Drawing Sheets

100

104 DOWNLOAD SYSTEM

102 AUDIT SYSTEM

108 NETWORK

106 CLIENT SYSTEM

(56) References Cited

U.S. PATENT DOCUMENTS

| | | | | |
|---|---|---|---|---|
| 6,832,319 | B1 | 12/2004 | Bell et al. | |
| 7,024,393 | B1 | 4/2006 | Peinado et al. | |
| 7,155,616 | B1 | 12/2006 | Hamlin | |
| 7,215,771 | B1 | 5/2007 | Hamlin | |
| 7,356,143 | B2 | 4/2008 | Morten | |
| 7,467,304 | B2 | 12/2008 | Bar-El et al. | |
| 7,594,275 | B2 | 9/2009 | Zhu et al. | |
| 7,925,894 | B2 | 4/2011 | Thibadeau | |
| 2004/0030650 | A1 * | 2/2004 | Okuyama et al. | 705/50 |
| 2008/0263356 | A1 | 10/2008 | Overby | |
| 2009/0052671 | A1 * | 2/2009 | Bauchot et al. | 380/277 |
| 2012/0066754 | A1 | 3/2012 | Karaoguz et al. | |
| 2012/0303974 | A1 | 11/2012 | Lin et al. | |

OTHER PUBLICATIONS

U.S. Appl. No. 13/460,766, filed Apr. 30, 2012; David L. Blankenbeckler etal., 40 pages.

U.S. Appl. No. 13/460,805, filed Apr. 30, 2012; David L. Blankenbeckler etal., 63 pages.

Office Action dated May 13, 2013 from U.S. Appl. No. 13/460,766, 19 pages.

Interview Summary dated Aug. 16, 2013 from U.S. Appl. No. 13/460,766, 2 pages.

Office Action dated Oct. 29, 2013 from U.S. Appl. No. 13/460,766, 19 pages.

* cited by examiner

DIGITAL RIGHTS MANAGEMENT SYSTEM AND METHODS FOR ACCESSING CONTENT FROM AN INTELLIGENT STORAGE

CROSS-REFERENCE TO RELATED APPLICATIONS

The present application claims priority to U.S. Provisional Application No. 61/622,312, filed Apr. 10, 2012 entitled, "DIGITAL RIGHTS MANAGEMENT SYSTEM, DEVICES, AND METHODS FOR DIGITAL CONTENT," and is related to U.S. patent application Ser. No. 13/460,604, filed Apr. 30, 2012, entitled "DIGITAL RIGHTS MANAGEMENT SYSTEM, DEVICES, AND METHODS FOR BINDING CONTENT TO AN INTELLIGENT STORAGE DEVICE," and U.S. patent application Ser. No. 13/460,766, filed Apr. 30, 2012, entitled "DIGITAL RIGHTS MANAGEMENT SYSTEM AND METHODS FOR PROVISIONING CONTENT TO AN INTELLIGENT STORAGE," all of which are herein incorporated by reference in their entirety.

BACKGROUND

Many different digital rights management ("DRM") systems have been proposed and implemented on various platforms. In general, DRM refers to technologies that are used to control the use of digital content and devices. For example, DRM is commonly used to prevent unauthorized copying of digital content.

Today, there exists a wide variety of computing devices that enable users to copy and distribute digital content, especially content that has been downloaded or stored on a storage device, such as a hard disk. Furthermore, most DRM systems to date have security weaknesses and have been circumvented. Unfortunately, due to these weaknesses of current DRM systems, content companies have limited their offerings or have employed DRM systems that are difficult to use.

BRIEF DESCRIPTION OF THE DRAWINGS

Systems and methods which embody the various features of the invention will now be described with reference to the following drawings, in which.

DETAILED DESCRIPTION

Figure 1:
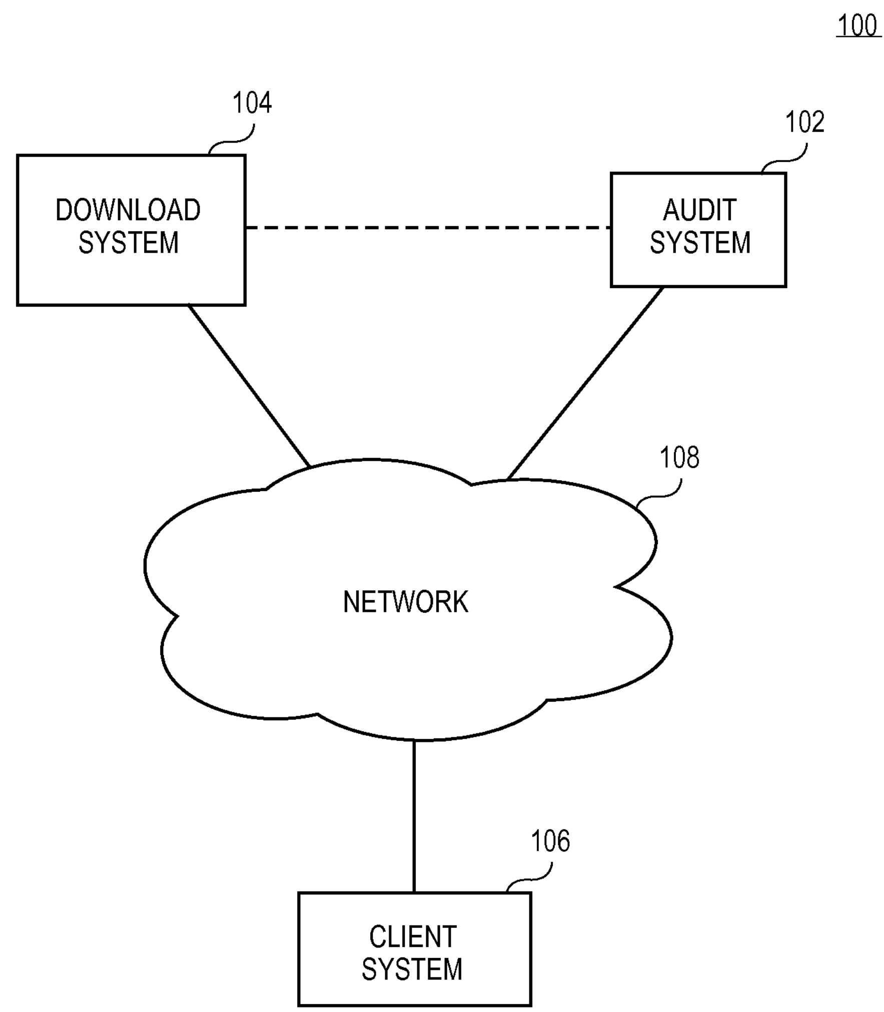
FIG. 1 shows an exemplary system according to one embodiment.

In one embodiment, digital content may be securely accessed based on a cryptographic key, such as a content key. Digital rights management ("DRM") methods and systems are provided for controlled distribution and playback of digital content. The digital content may comprise the content itself plus metadata. The content may be text, documents, audio, video, multimedia, video games, etc. in any known format. The content metadata may be any data or information associated with the content that is used for handling of the content. The content metadata may be employed to provide for secure handling of the digital content and to provide DRM protections. The content metadata may also comprise one or more digital certificates.

For example, servers providing content may encrypt each copy of content based on an access key that is unique to that copy of the content. Thus, if an access key is compromised, the protection of only one copy of the content is compromised. In another embodiment, asymmetric cryptography may be employed for securing content. In one embodiment, the content that is encrypted may only be a portion or portions of the text, document, audio, video, multimedia, etc.

In addition, the content may be uniquely bound to specific devices, such as an intelligent storage device, based on the configuration of the access key. For example, the access key for the content is generated from at least two components. The first component is a binding key that is unique to the storage device on which the content is stored. In one embodiment, the storage device may generate the binding key using a random number and inputting the random number into a key generator. The second component is a content key that is unique to the content. In one embodiment, the algorithm for generating the access key may be implemented as a licensable or renewable function.

In one embodiment, digital content may be securely accessed based on a cryptographic key, such as a content key. In addition, in one embodiment, only certain entities are provided the algorithm for generating the access key based on the two components. For example, the storage device holding content does not retain any copies of its binding key nor does it have the algorithm for generating the access key. The algorithm for generating the binding key may be licensable and renewable.

In one embodiment, two-way authentication is employed, for example, using public key infrastructure ("PKI") and public key certificate-based authentication to ensure that entities in the system are trusted. The various components of the system, such as a storage device, may be intelligent, and thus, capable of two-way authentication with each other, which was not possible in the prior art. For example, the storage device and the player or download server may mutually authenticate with each other. This form of authentication ensures that the storage device confirms a trust relationship with the player and vice versa. Conventional DVD and Blu-ray discs did not contain such features to authenticate or establish trust with a player or download server. The PKI thus provides an environment in which entities of the DRM system can register their identity and establish trust with each other.

In one embodiment, digital content may be provisioned and bound to a specific device, such as a storage device. In one embodiment, the entities of the DRM system employ public key certificates, i.e., digital certificates for authentication of their identity and determine authorization for various uses of their content. In another embodiment, a trusted party manages a certificate authority ("CA") to supervise the PKI and digital certificates. In addition, multiple levels of CA's can be accommodated in any of the embodiments.

All devices of the DRM system may be issued a certificate from one or more of the CA's. If needed, one embodiment may provide for full revocation of a certificate for an entity. As noted, two-way mutual authentication may be employed between entities to establish secure communications channels for exchanging and distributing the content. Each item of content may also be issued a digital certificate. This allows the content to play a role in determining whether a device can be trusted.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

FIG. 1 shows an exemplary system 100 of the embodiments. As shown, the system 100 may comprise, among other things, an audit system 102, a download system 104, a client system 106, and a network 108. These components and certain aspects of their operation will now be further described.

The audit system 102 serves as a trusted party for system 100. In addition, the audit system 102 may provide various management functions related to the distribution and playback of content in system 100. In one embodiment, the audit system 102 validates and certifies encryption keys as part of the PKI employed in system 100. The audit system 102 is further described with reference to FIG. 2.

The download system 104 comprises the hardware and software components for distributing content in system 100. In one embodiment, the download system 104 comprises a website, which includes links to the content. The download system 104 may also provide links to allow for transactions with the audit system 102, such as links to key servers and certificate authorities. The download system 104 is further described with reference to FIG. 3.

The client system 106 may be any device used to access content provided by the system 100. For example, the client system 106 may comprise a computer, a television, a portable or mobile device, a video game console, a portable video game console, as well as associated storage. Any device capable of downloading, storing, or playing content may be implemented as part of the client system 106. For example, the client system 106 may comprise a desktop computer, a laptop computer, a tablet, a smartphone, a television, a digital video recorder, a set-top box, a video game console, a portable video game console, or other form of electronic device. The client device 106 may also comprise a network that is wired and/or wireless and storage, such as a network attached storage (NAS) or external drives. The embodiments may work with any form of storage device, such as solid state and flash memory storage. The client system 106 is further described with reference to FIG. 4.

The network 108 provides a communication infrastructure by which the various components of system 100 communicate. Network 108 may comprise any collection of networks and network elements. For example, the network 108 may be implemented over the Internet. However, the network 108 may comprise any local area network, metropolitan area network, or wide area network and may be implemented as a private network, a public network, etc. Additionally, network 108 may comprise wired or wireless communication links.

The system 100 may support several scenarios for downloading and playing content. For example, content can be downloaded via the network 108 to a portable storage device from client system 106. The content may then be played on a playback device, such as a Blu-Ray player, game console, TV, by streaming the content from the storage device. As another example, the playback device may include an integrated storage device that is used for both download and playback of content. As another use case, content may be downloaded onto a NAS system in client system 106.

Yet another implementation may comprise a client system 106 having a media player or storage device to which the content is bound. A user of client system 106 may then remotely access the content and play it on a mobile device, such as an iPad, iPod, iPhone, a portable video game console, such as PlayStation® portable or a Nintendo DS, etc., which is connected to the media player or storage device via a secure connection, such as a wireless connection, over a WiFi, 3G, 4G, or other communication channel. In another implementation of system 100, the client system 106 comprises a portable media player or storage device that is accessible wirelessly, such as via Bluetooth or WiFi or similar communication system. The portable media player or storage device in client system 106 may thus act as a source of content for playback on portable and network enabled viewing devices in client system 106.

Figure 2:
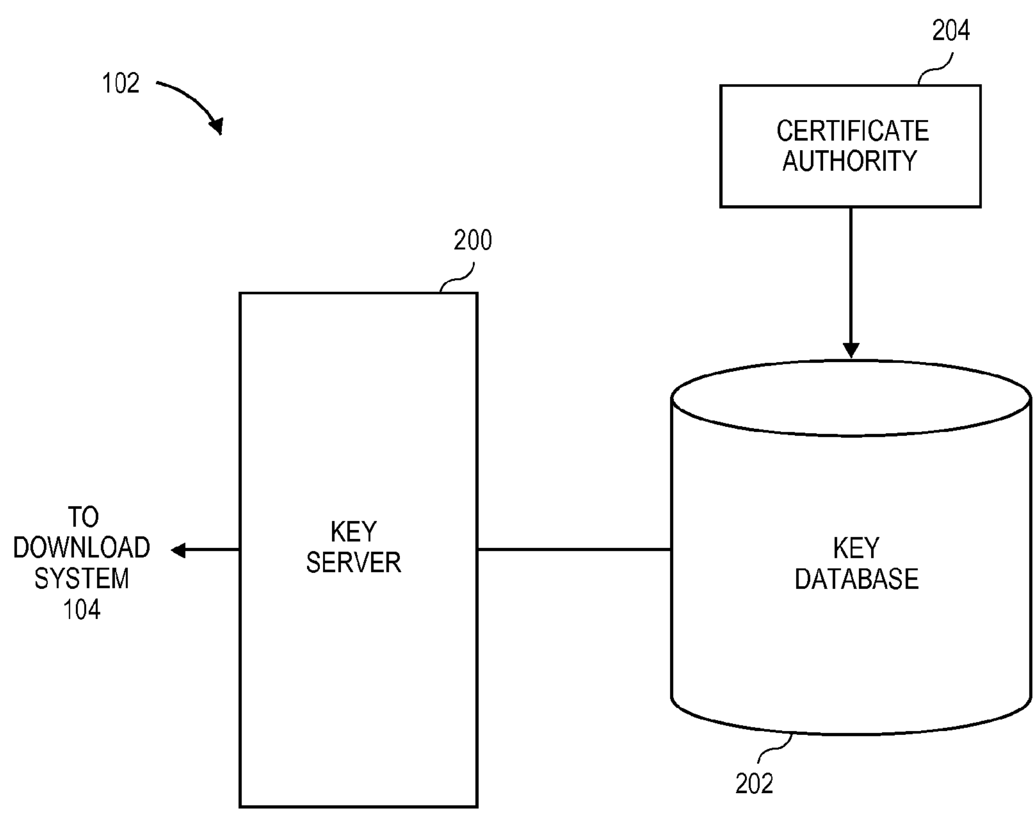
FIG. 2 shows an exemplary audit system according to one embodiment.

FIG. 2 shows an exemplary audit system of the embodiments. As shown, the audit system 102 may comprise a key server 200, a key database 202, and a certificate authority 204.

The key server 200 is a server that receives and serves various cryptographic keys used in one embodiment. The key server 200 may be implemented using known hardware and software. In one embodiment, the key server 200 distributes keys as part of a digital certificate. The digital certificate may contain the key and also information about the owner of the key. The key server 200 may provide certificates in a known format, such as X.509, PKCS, Open PGP, etc.

The key database 202 stores the keys and other related information used by the key server 200. The key database 202 may be implemented using well-known database management systems, such as Oracle, DB2, Microsoft SQL, PostgreSQL, and MySQL.

The certificate authority (or CA) 204 issues digital certificates for the system 100. Certificate format and contents may be customized for each trusted party in system 100. In addition, in one embodiment, each item of content may have a trusted party certificate as part of its metadata. The certificates allow software associated with the content to independently determine if a player in client system 106 is attempting to access the content can be trusted. For example, software associated with the content could restrict high definition content or other portions of content from being accessible to a player, if the player in client system 106 is not trusted. In system 100, any trusted party can revoke all certificates, revoke certain certificates, or certain portions of certificates that have been issued In one embodiment, public key infrastructure ("PKI") is used for certificate signing. For example, in system 100, PKI is used in client system 106 during device authentication and to establish a secure communications channel between a storage device, download system 104, or playback device. In one embodiment, two-way authentication is employed between the various entities in system 100. For example, the storage device may be an intelligent device that is configured to actively authenticate and establish a trust relation with a playback device or download server 104 based on two-way authentication.

Between entities of system 100, each secure session may use unique security parameters. For example, the session key, session ID, initialization vector ("IV"), hash-based message authentication code ("HMAC") key may be made unique for each session. In one embodiment, the system 100 uses secure channels of communication that are protected based on symmetric cryptography. In another embodiment, the system 100 may use PKI to establish secure channels.

Figure 3:
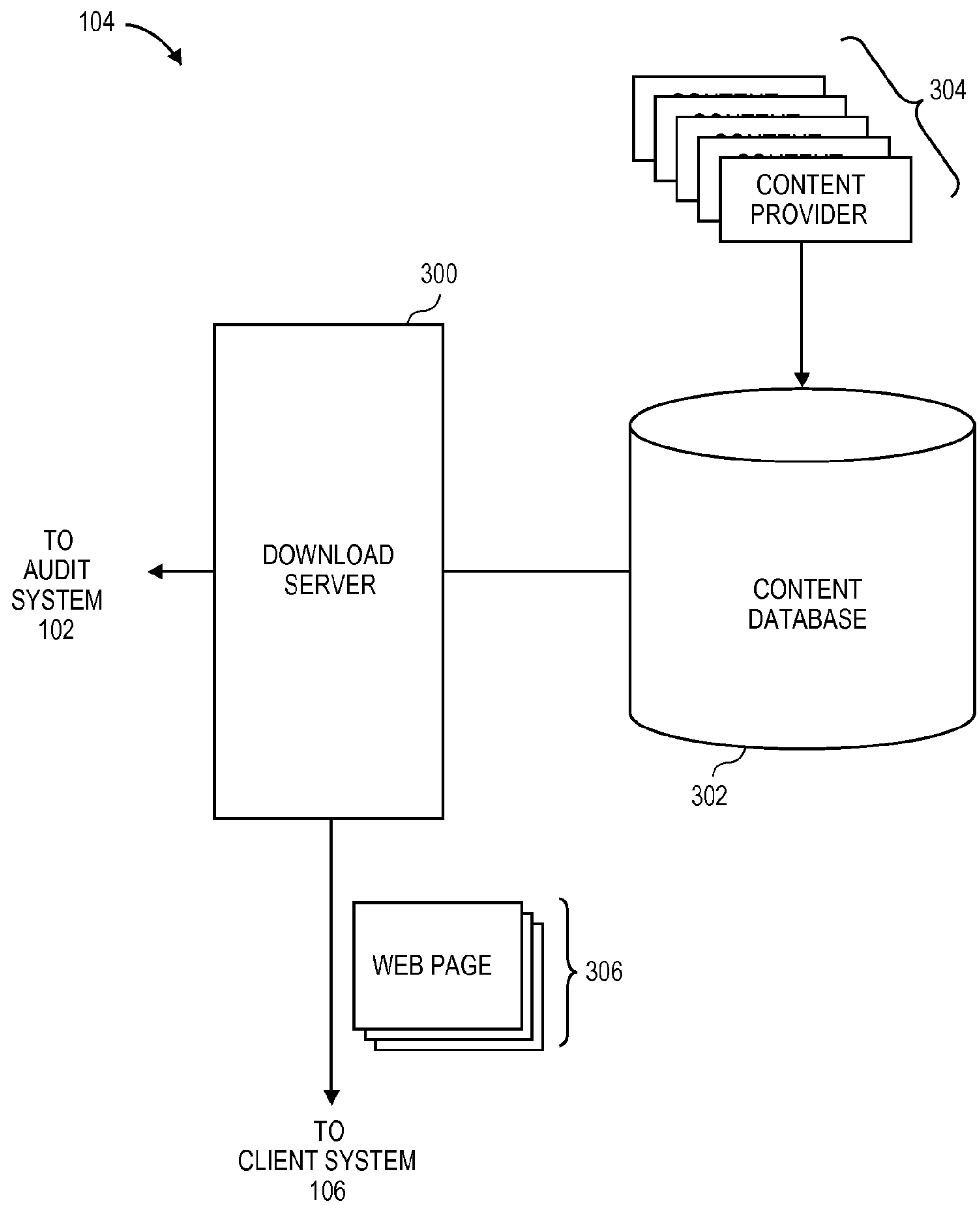
FIG. 3 shows an exemplary download system according to one embodiment.

FIG. 3 shows an exemplary download system of the embodiments. As shown, the download system 104 may comprise a download server 300 and a content database 302.

The download server 300 delivers the content for the system 100, for example, to client system 106. In one embodiment, download server 30 encrypts the content with an access key that may be derived from a binding key and a content key. The binding key and content key are further described below.

As shown, the download server 300 may comprise a web server that provides various web pages 306 to client system 106 to make content in content database 302 accessible. In one embodiment, the download server 200 provides one or more websites having a collection of web pages 306 in order to serve the content.

In one embodiment, each copy of content is uniquely encrypted. The content may be uniquely encrypted in its entirety or certain portions of the content may be uniquely encrypted. Thus, if an item of content or its access encryption is ever compromised, the compromise is limited to that item of content. As will be described further below, only the download server 300 and a player have the algorithm to generate the access key. In addition, as noted, the algorithm for generating the access key may be licensable or a renewable function.

The content database 302 stores the content, content metadata, and related information served by the download server. Provides a storage and access infrastructure for providing the items of content. Such database management systems are known to those skilled in the art.

The content providers 304 conceptually represent the source of the content. For example, the content providers 304 may represent other databases or content repositories, content delivery networks, and the like. Any source of content may be included in any of the embodiments.

Figure 4:
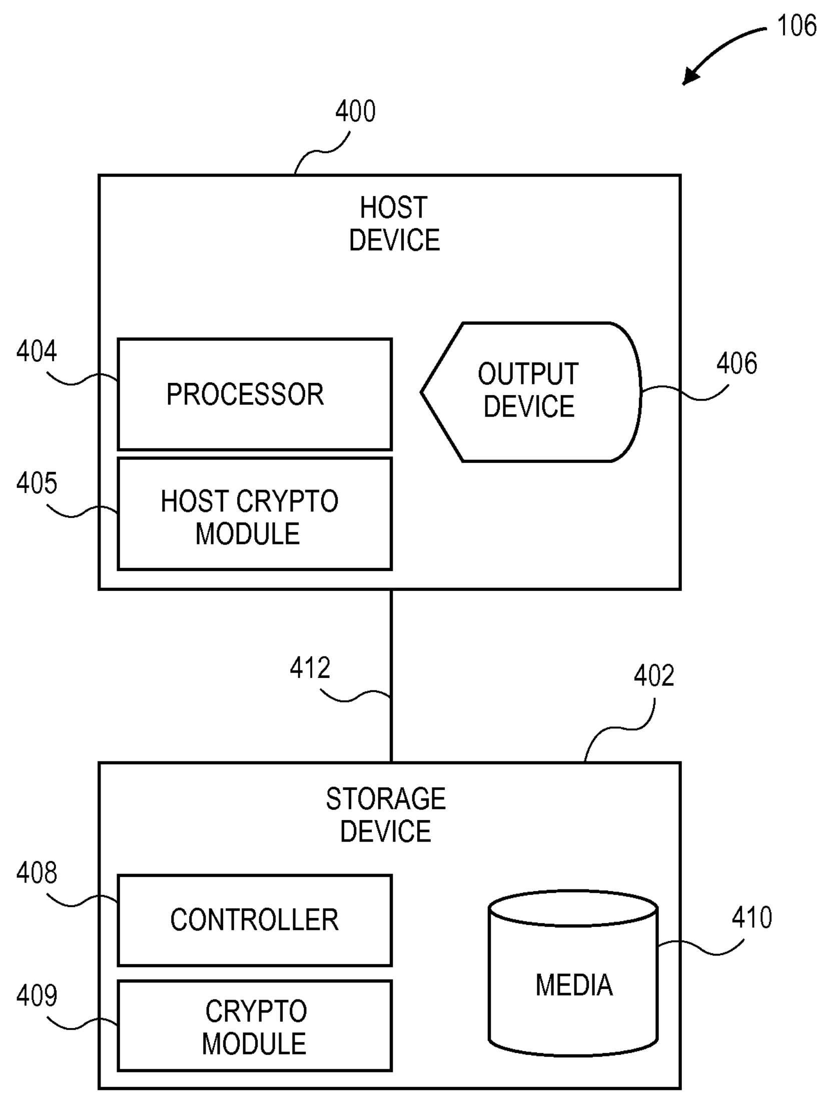
FIG. 4 shows an exemplary client system according to one embodiment.

FIG. 4 shows an exemplary client system 106 of the embodiments. A concern of many content providers is software-based players in client systems are considered a high security risk due to their ease of modification and susceptibility to hacking. One benefit of the embodiments is that client system 106 includes devices having a hardware root of trust. A hardware root of trust in a device comprises secure cryptographic hardware that enables playback of the content that is not just software based, but instead makes use of the cryptographic hardware provided in the hardware root of trust.

For example, in one embodiment, media players may include dedicated hardware cryptographic processing circuits and cryptographic boundaries for performing secure computations and secure storage of critical cryptographic parameters. As another example, network attached storage ("NAS") controllers may include dedicated hardware that can serve as a root of trust. Accordingly, one embodiment may provide a secure DRM system enabling secure download of content, secure storage of content, and secure playback of content.

As will be further described, the client system 106 comprises an intelligent storage device 402 having a controller 408 that includes a hardware root of trust as part of a cryptographic processing module 409. In the embodiments, the cryptographic processing module 409 is isolated from the other controller functionality. Clear text asymmetric and symmetric key access is limited to the cryptographic module 409. In this embodiment, asymmetric and symmetric keys may be generated within the cryptographic module 409. Public/private key pairs are used with the DRM of system 100. Any keys stored outside the cryptographic module 409 are cryptographically protected. Since the asymmetric and symmetric keys are inside the cryptographic module 409, it is difficult for an attacker to gain access to the private keys. This allows for a secure PKI implementation as part of the DRM of system 100. In another embodiment, various keys or encryption data may be injected or securely stored on the storage device 402. For example, one or more keys may be injected on to the storage device 402 in a secure manufacturing environment.

In one embodiment, the cryptographic module 409 is used to generate additional keys securely inside its boundaries. For example, the cryptographic module 409 may be configured to generate a binding key that is used to bind content to the storage device 402. The cryptographic module 409 may also include a capability to digitally sign secure information and store it in non-secure memory, and digitally sign and encrypt secure information and store it in non-secure memory.

In one embodiment, playback devices in client system 106, such as host device 400, may also be issued certificates from a certificate authority 204. The host device 400 may be, for example, a computer, a television, a portable or mobile device, a video game console, a portable video game console. This certificate may be stored in a secure area not accessible by the processor of the player in one embodiment. In another embodiment, the player running, for example, on a host device 400 may store the certificate anywhere, such as, in a user area of the storage device 402 or other non-secure area. The playback device may store the certificate in encrypted form or protected form, such as with a digital signature. When the player and storage device 402 perform authentication, the cryptographic modules in both devices will be the only entities that have access to the secure data to perform authentication and to establish a secure communication channel.

However, in one embodiment, the content and content metadata does not provide the access key for accessing the content. Instead, once a secure communication channel is established, the playback device (such as host device 400) will request the binding and content key from the storage device 402. Responsive to this request, the storage device 402 may then send the binding and content keys to the player so that it can generate the access key. The access key is used to decrypt and render the content. Those skilled in the art will recognize that by using these secure cryptographic modules for security related communications and handling of security parameters, and content metadata (such as the binding and content keys), the DRM of system 100 is more difficult to attack and compromise than existing systems.

As shown, the host device 400 may comprise, among other things, a processor 404, a host cryptographic module 405, and an output device 406. These components of host device 400 will now be further described.

The processor 404 comprises the hardware for executing instructions directing the operations of the host device 400. Such processors are known to those skilled in the art.

The host cryptographic module 405 comprises the hardware for carrying out cryptographic operations for the host device. In addition, the host cryptographic module 405 may be packaged or embedded with various security measures to resist tampering.

The output device 406 represents any device intended to output content. For example, the output device 406 may comprise a display, audio speakers, etc. Such output devices are well known to those skilled in the art.

The storage device 402 may comprise, among other things, a controller 408, a cryptographic module 409, and a storage media 410. These components of storage device 402 will now be further described.

The controller 408 comprises the hardware and firmware that controls the operation of the storage device 402 and enables communications with the host device 400. Controller 408 may be implemented using known hardware and components.

The cryptographic module 409 provides a basis of trust, such as a hardware root of trust, for the storage device 402. In one embodiment, the cryptographic module 409 is a secure crypto-processor that is configured to perform various cryptographic operations. In one embodiment, cryptographic module 409 may be implemented as an external system on chip that is packaged with various security measures to make tamper resistant or detection. In another embodiment, a cryptographic module 409 may be implemented as part of or embedded within another system-on-chip or other hardware that is packaged with various security measures to detect tampering and make it tamper resistant. The cryptographic module 409 may or may not be isolated from the other system-on-chip ("SoC") functions, The storage media 410 refers to the physical media used by the storage device 402 to store information. In one embodiment, the storage media 410 may comprise magnetic media, optical media, semiconductor media, such as flash memory, and the like. The storage media 410 may comprise any combination of these media in one embodiment.

Figure 5:
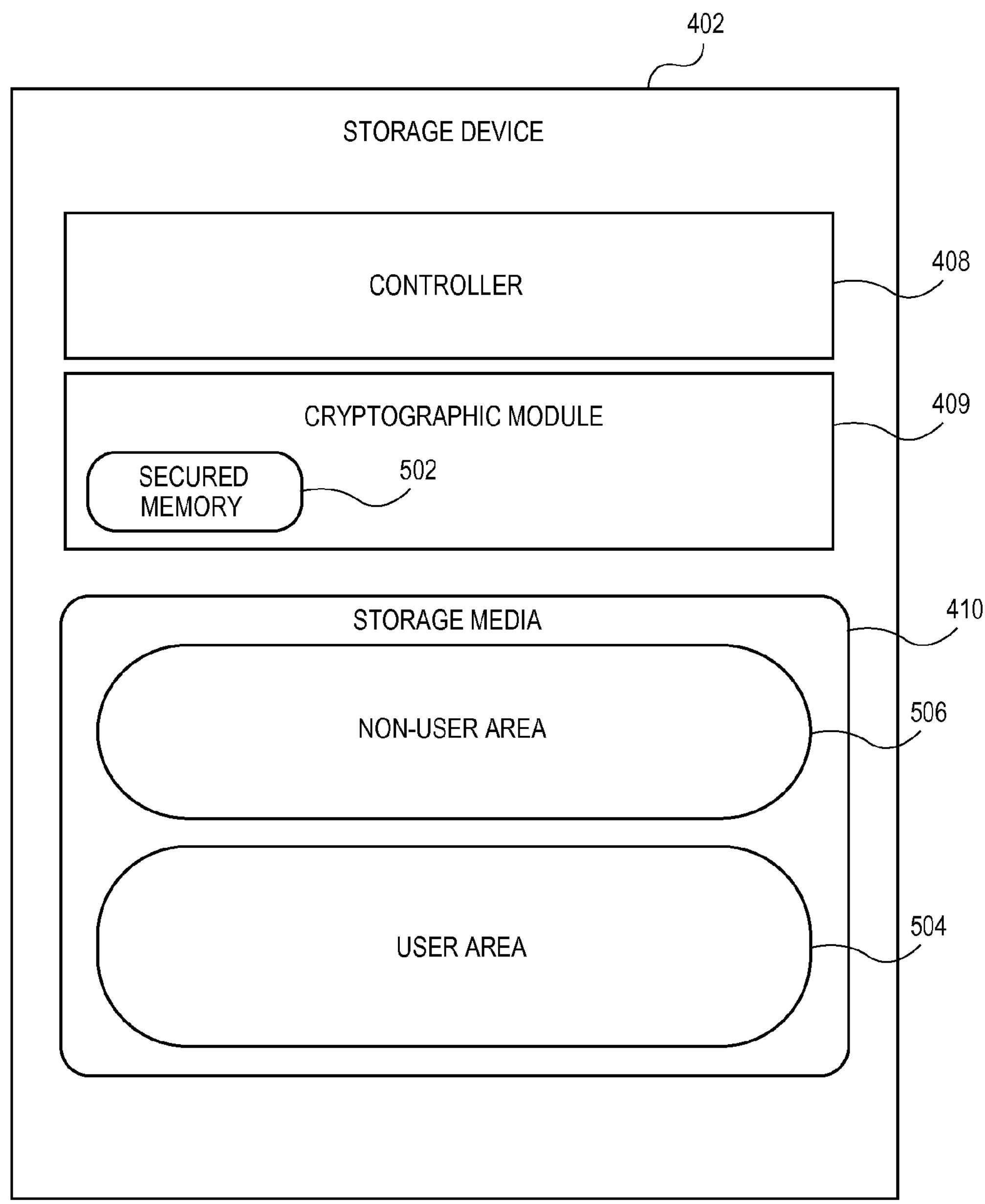
FIG. 5 shows an exemplary storage device according to one embodiment.

FIG. 5 further shows an exemplary storage device 402 of the embodiments. As shown, the cryptographic module 409 may comprise a secured memory 502. In addition, the storage media 410 may comprise a user area 504 and a non-user area 506.

The secured memory 502 provides a secure area to store sensitive information, such as content metadata, related to the DRM provided by system 100. In one embodiment, the secured memory 502 is implemented as a one-time programmable non-volatile memory ("OTP NVM"). As an OTP NVM, the secured memory 502 can only be programmed once and is difficult to alter. In addition, the secured memory 502 may also comprise one or more memories, such as a ROM, static RAM, and dynamic RAM.

As to user area 504, this area of storage media 410 is provided as storage space that is accessible by the host device 400. For example, the user area 504 may be addressable based on logical block addresses ("LBA") used by the host device 400.

The storage device 402 can be configured to contain a partition in the user space 504 that is secured. That is, data in this partition may be encrypted using a separate key generated by the cryptographic module 409. Access to this partition would only granted to authenticated download clients or players (such as players running on host system 400). In one embodiment, all or certain data from this partition in user space 504 may only be sent over a secure authenticated channel.

This partition of user space 504 can be used, for example, for additional content metadata files and information related to the DRM of system 100. The actual content itself may be sent from the download server 300 or to a player in client system 106 only in encrypted form, so the content can be stored in the user space 504.

As shown, the storage device 402 may also comprise a non-user area 506. The non-user area 506 is a reserved area of the storage media 410 that is not directly accessible by the host 400. For example, the non-user area 506 may refer to an area that is not addressable by the host system 400. In one embodiment, the non-user area 506 is reserved for use by the controller 408 and cryptographic module 409, for example, to store various sensitive information, such as content metadata information, related to the DRM of system 100.

In one embodiment, the cryptographic module 409 may create new secure keys and allow the storage device 402 to create a secure unique disk encryption key for a special partition area of the medium that is not visible in the user LBA space, such as the non-user area 506. The cryptographic module 409 using this key may thus encrypt all data written to this non-user area 506.

The non-user area 506 may be used to store secure metadata related to the DRM of system 100. This metadata may include, for example, certificates, key files, license files, etc. For example, the storage device 402 may have a certificate issued to it from certificate authority 204. This certificate may be stored in this non-user area 506 and will be encrypted with the key for this area. This will bind the certificate to the storage device 402. Thus, if a clone copy of the drive is somehow fabricated, the clone will not include the encryption key used for the non-user area 506, and thus, the data stored in this area cannot be correctly decrypted. Alternatively, critical security parameters, such as keys, certificates, or other objects, may be individually cryptographically protected and stored to the storage media.

Accordingly, in one embodiment, in order to access content, the controller 408 and the recording medium 410 cannot function separately from each other. In other words, a complete copy of either the controller 408 or the medium 410 individually will not be sufficient to access content.

Figure 6:
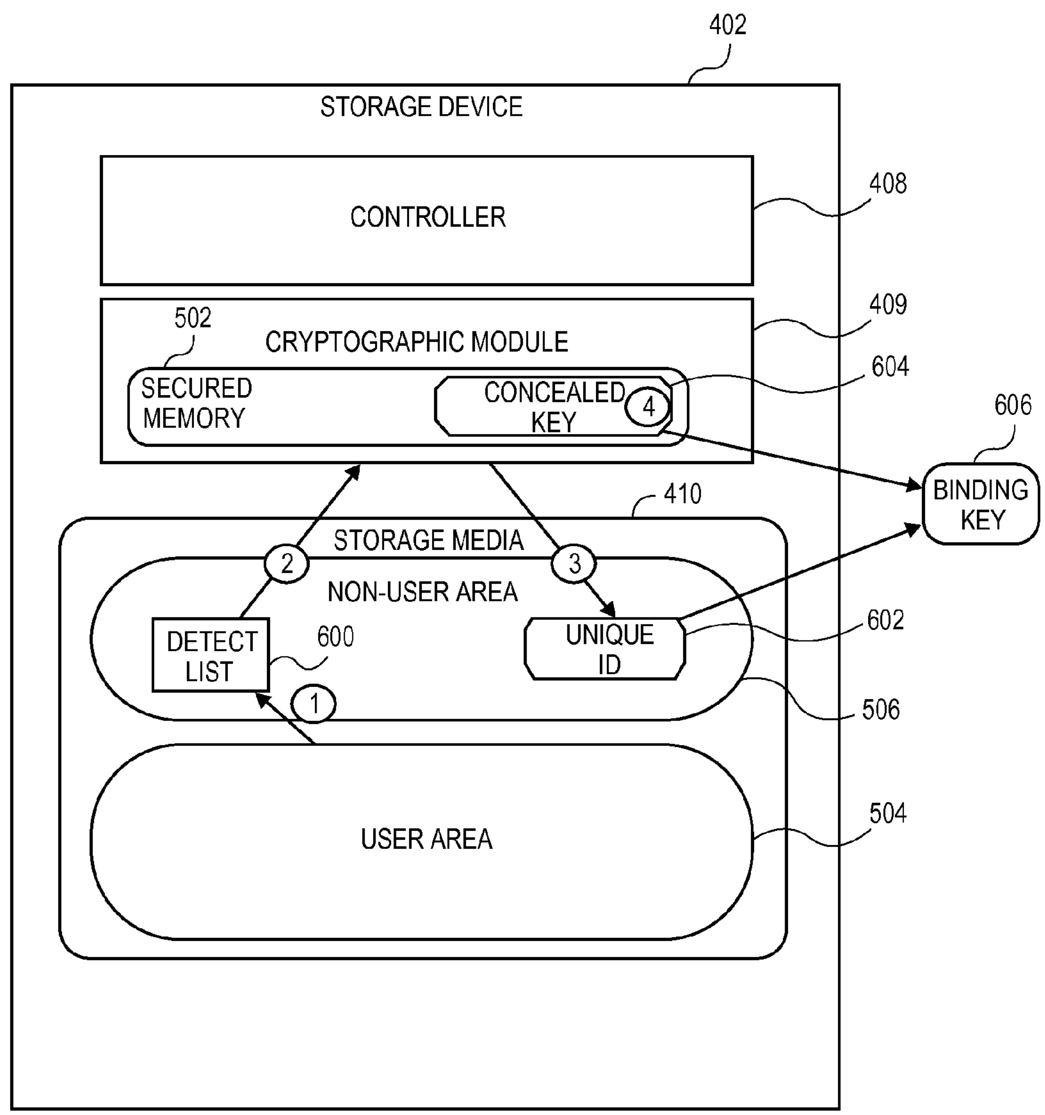
FIG. 6 illustrates an exemplary process flow for generating a binding key that binds content to a storage device according to one embodiment.

FIG. 6 illustrates an exemplary process flow for generating a binding key that binds content to a storage device. In one embodiment, the storage device 402 may generate the binding key using a random number and inputting the random number into a key generator. The key generator may be software running in storage device 402 or a hardware component of storage device 402. In one embodiment, the binding key is made from two parts. In one embodiment, the first part is based on the defect list of the storage device. The second part is based on a key concealed by a cryptographic module on the storage device. In order to protect the binding key, the binding key is not stored with the content or with the content metadata in the storage device 402. Instead, the parts of the binding key are stored separately. In addition, in one embodiment, the binding key is generated as an ephemeral key, and thus, computed by the storage device 402 only when needed. This method also includes the capability for renewable functions. As noted, the binding key may be unique to individual storage devices or unique to a class of devices, such as devices of the same type, etc.

As shown, first, the storage device 402 is prompted to determine or identify a unique characteristic about itself. For example, the storage device 402 may determine or identify a defect list 600. In one embodiment, the defect list 600 corresponds to the P-list or time-zero list of defects that were present on storage media 410 at the time of manufacture. Of course, in other embodiments, the unique characteristic may be derived or originate from other portions of the storage device 402.

Second, the cryptographic module 409 cryptographically processes the defect list 600 and generates a unique identifier 602. For example, the cryptographic module 409 may calculate a hash of information from the defect list 600. In addition, the cryptographic module 409 may digitally sign the unique identifier 602. Alternatively, the unique identifier may be generated by using a random number generator to generate a random number that is unique to the storage device. For example, the cryptographic module 409 may comprise a random number generator that is a physical device or component within cryptographic module 409 or software running in the cryptographic module 409. Alternatively, the random number generator may be separate software or a hardware device running on the storage device 402.

Third, the cryptographic module 409 may store the unique identifier 602 in a secure area. For example, as shown, the cryptographic module 409 may also store the cryptographically protected unique identifier 602 in the non-user area 506.

Fourth, the cryptographic module 409 may generate a concealed key 604. In one embodiment, the key 604 is concealed in that it is not stored with the other content metadata and instead resides in the secured memory 502. The cryptographic module 409 may generate one or a set of multiple concealed keys 604. Thus, if one of these keys becomes compromised, the cryptographic module 409 may switch to the next key in the set. If all the keys are used, or if it is not desired to create and store a set of keys, then the cryptographic module 409 may generate a new concealed key 604 upon request. Of note, the controller 408 may be configured to track which content is bound to which key.

Based on the unique identifier 602 and the concealed key 604, the storage device 402 may generate a binding key 606 that is derived from information provided by both the controller 408 and from unique characteristics of the storage medium 410. In one embodiment, the cryptographic module 409 ephemerally generates the binding key 606.

The binding key 606 cryptographically binds content to the storage device 402. For example, the binding key 606 may be sent as part of the content's metadata over a secure communications channel to the download server 300 in download system 104. The download server 300 may then use the binding key 606 as one component of an access key used to encrypt the content.

At appropriate times, the binding key 606 may also be made available to authenticated players over a secure channel for use during playback of the content. For example, the storage device 402 may be configured with a special command that is only accepted when the sending device has been authenticated and is communicating over a secure channel.

Based on the binding key 606, even if an exact bit-by-bit copy of the entire media 410 is accomplished, the cloned media will not be usable for rendering the content since the concealed key in storage device unique and securely stored in the secured memory 502 of the cryptographic module 409 and is not copy-able or clone-able to another drive.

Figure 7:
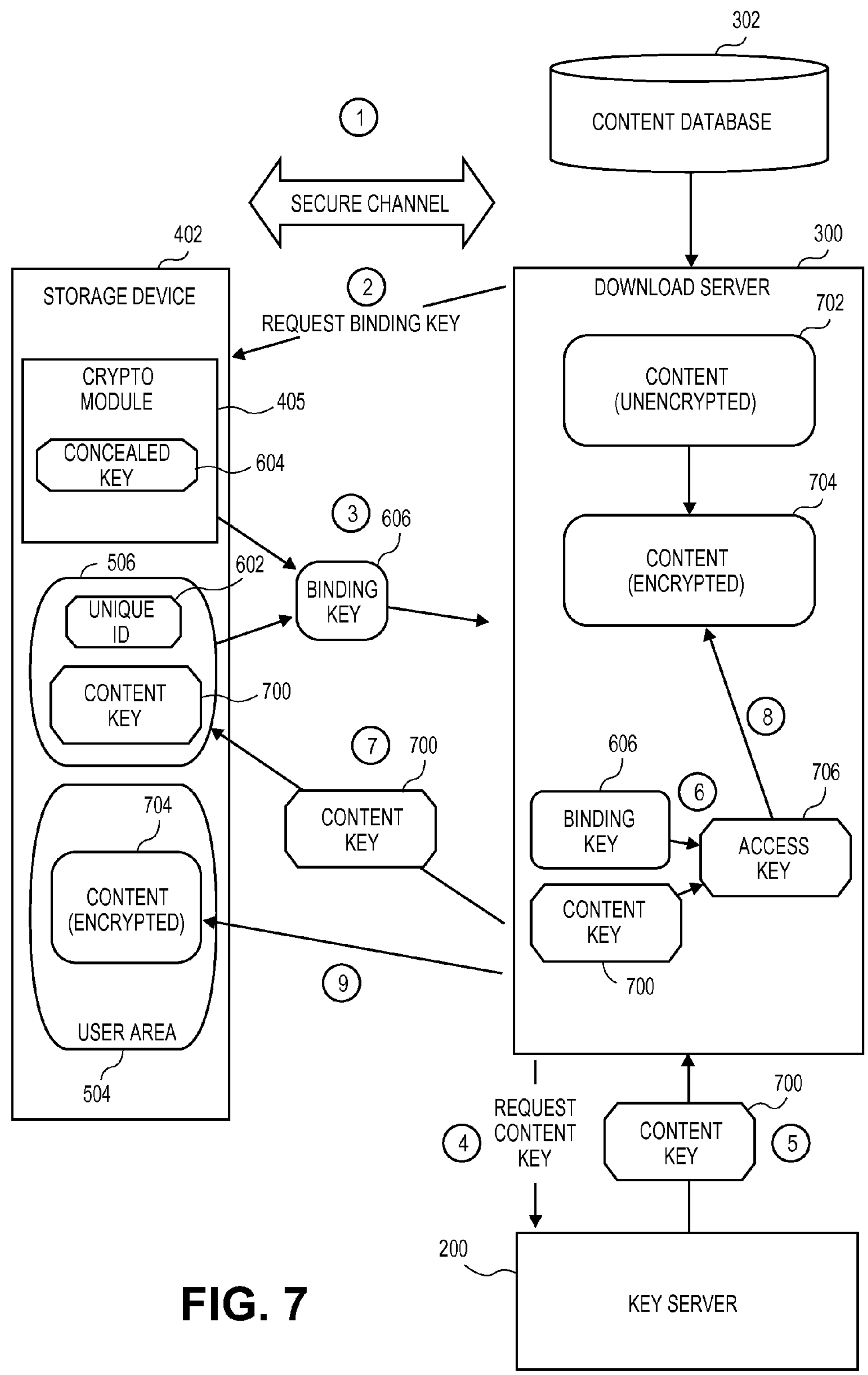
FIG. 7 illustrates an exemplary process flow for provisioning content to a storage device according to one embodiment.

FIG. 7 illustrates an exemplary process flow for provisioning content to a storage device. In this embodiment, revocability and renewability are attributes of the DRM system. As an additional security system component, the process flow illustrated may comprise various renewability features. For example, keys may be retired or random keys pre-generated can be used with a secure allocation algorithm that can either be varied from time to time or which makes use of multiple keys in a random fashion for each item of content to be provisioned to the storage device 402. For example, the embodiments may utilize tokenizing of an update file that could be suitable for all players.

In one embodiment, the process relates to provisioning of content and content metadata, such as a binding key and content key. Other metadata, such as digital certificates, etc., may also be provisioned as part of an embodiment.

As shown, first, the storage device 402 and the download server 300 establish a secure communication channel with each other. For example, the download server 300 and the storage device 402 may employ PKI to establish a secure communications channel. In particular, the host 400 may request a certificate from the storage device 402. The storage device 402 may retrieve its certificate, for example, from its non-user area 506 in media 510. The storage device 402 may then send a device session ID and its certificate. The certificate includes its public key; $\text{Public}_{Device}$.

In one embodiment, host 400 (not shown in FIG. 7) verifies the certificate. For example, the host 400 may check the signature on the certificate. Host 400 may also checks its revocation list to make sure the certificate from storage device 402 is not revoked. Alternatively, host 400 may communicate over network 108 with audit system 102 and certificate authority 204 to verify the certificate and check revocation status of the certificate.

Host 400 then responds by sending a host session ID and its certificate, which includes its public key, $\text{Public}_{Host}$, to storage device 402. The storage device 402 verifies the host certificate and checks the signature. The storage device 402 may also check its own revocation list to make sure the host 400 is not revoked.

Next, the host 400 may request a session key from the storage device 402. In response, in one embodiment, the storage device 402 encrypts a random session key, a random device initialization vector ("IV"), and random device hash-based message authentication code ("HMAC") key with $\text{Public}_{Host}$, and sends it to host 400.

Host 400 decrypts the information with $\text{Private}_{Host}$ to recover the device session key, the device IV, and the device HMAC key. Host 400 encrypts a random host session key, a random host IV, and random host HMAC key with $\text{Public}_{Device}$, and sends this information to storage device 402. The storage device 402 then decrypts this information with $\text{Private}_{Device}$, to recover the host's 400 session key, host IV, and host HMAC key.

The host 400 may also encrypt a random challenge with the device session key and sends it to the storage device 402. The storage device 402 decrypts the host random challenge with the device session key, and then encrypts the host random challenge with the host session key, and sends this information back to the host 400. The host 400 decrypts the host random challenge with the host session key and confirms it matches what was originally sent to the storage device 402. This proves the storage device 402 knows the private key that corresponds to the public key that was sent with its device certificate.

For further confirmation, the host 400 may request a random challenge from the storage device 402. The storage device 402 encrypts a device random challenge with the host session key and sends this information to the host 400. The host 400 then decrypts the device random challenge with the host session key and encrypts the device random challenge with the device session key and sends this information back to the storage device 402. The storage device decrypts the device random challenge with the device session key and confirms it matches what was originally sent to the host 400. This proves the host 400 thus knows the private key that corresponds to the public key that was sent with the host's 400 certificate In one embodiment, the storage device 402 may use AES encryption with the host session key and host IV for secure messages to the host 400. The host 400 also uses AES encryption with a device session key and device IV for secure messages to the storage device 402.

Once the secure session has been established, session communications may be carried out using asymmetric or symmetric algorithms. In one embodiment, each secure message may include a header with a sequence number and message length, a body message AES encrypted with appropriate session key and IV, and a footer having a SHA-256 HMAC of message body. In another embodiment, session communications are established based on asymmetric encryption and then secured based on symmetric encryption. For example, once the secure session has been established, session communications may be carried out based on symmetric encryption, such as AES encryption and AES decryption with the session keys and IV's established. Each secure message may include a header with a sequence number and message length, a body message AES encrypted with appropriate session key and IV, and a footer having a SHA-256 HMAC of message body. In another embodiment, asymmetric encryption may be employed to secure traffic during the session, as well.

Second, now that secure channel has been established, the download server 300 requests the binding key from the storage device 402. In particular, the download server 300 may send a message via the secure channel to the storage device 402. As noted, in one embodiment, the binding key 606 is initially absent from the content's metadata and is generated when needed.

Third, the storage device 402 generates the binding key 606. In particular, the cryptographic module 409 generates the binding key 606 based on the unique key 602 and the concealed key 604.

In one embodiment, the cryptographic module 409 employs a one-way hash algorithm or an Advance Encryption Standard (AES) algorithm to generate the binding key, Kb, where:

$$Kb=F(K\mathrm{root},IDm)$$

Where

F is a one-way function,

Kroot is a key generated by the cryptographic module 409, i.e., the concealed key 604, IDm is a unique media identifier number assigned during manufacture of the storage device 402, such as unique identifier 602.

Alternatively, the cryptographic module 409 may generate the binding key using a random number, such as from a random number generator, and inputting this random number into a key generator. The key generator may be software or a hardware component in the cryptographic module 409.

Fourth, the download server 300 requests from the key server 200 a content key for protecting the content. The content key may be assigned to the content in various ways. For example, the key server 200 may assign a content key 700 that is unique to each item of content. In one embodiment, the content key 700 is provided as part of the content's metadata and stored on the storage device 402. The content key 700 may be cryptographically protected when sent to the host 400.

Fifth, the key server 200 provides the content key 700 to the download server 300. In particular, the key server 200 may establish a secure channel with the download server 300, for example, based on PKI.

Sixth, the download server 300 generates an access key 706 based on the binding key 606 and the content key 700. In particular, the download server 300 may employ a unique algorithm to cryptographically combine the binding key 606 and content key 700 and generate the access key 706, for example, based on a one-way hash algorithm. The unique algorithm may be known only to certain entities of the system 100, such as the download server 300 and trusted playback devices in client system 106. The algorithm may be a licensable or renewable function. In addition, one or more algorithms may be passed from the download server 300 to trusted components in client system 106 via a field or portion in the secure metadata of the content. For example, a set of multiple algorithms may be initially configured or established within trusted components of client system 106. The download server 300 may then provide a pointer or indicator in a content's secure metadata which of the set algorithms to employ when generating the access key In one embodiment, the access key 706 is not included in the content metadata nor is it stored on download server 300. For example, instead, the download server 300 may be configured to ephemerally generate the access key 706. Alternatively, information for generating the access key 706 may be archived to a secure remote storage by the download server 300. For example, the audit system 102 may serve as a secure repository for securely storing the binding key 606 and/or the content key 700.

Seventh, the download server 300 provides the content key 700 to the storage device 402. The storage device 402 then securely stores the content key 700. For example, the storage device 402 may store the content key 700 in the non-user area 506.

Eighth, the download server 300 encrypts all or portions of the content 702 into encrypted content 704. For example, the download server 300 may employ AES encryption to encrypt the content 702 based on the access key 706.

Ninth, the download server 300 provides the encrypted content 704 to the storage device 402. The storage device 402 may then store the encrypted content 704, for example, in its user area 504.

Figure 8:
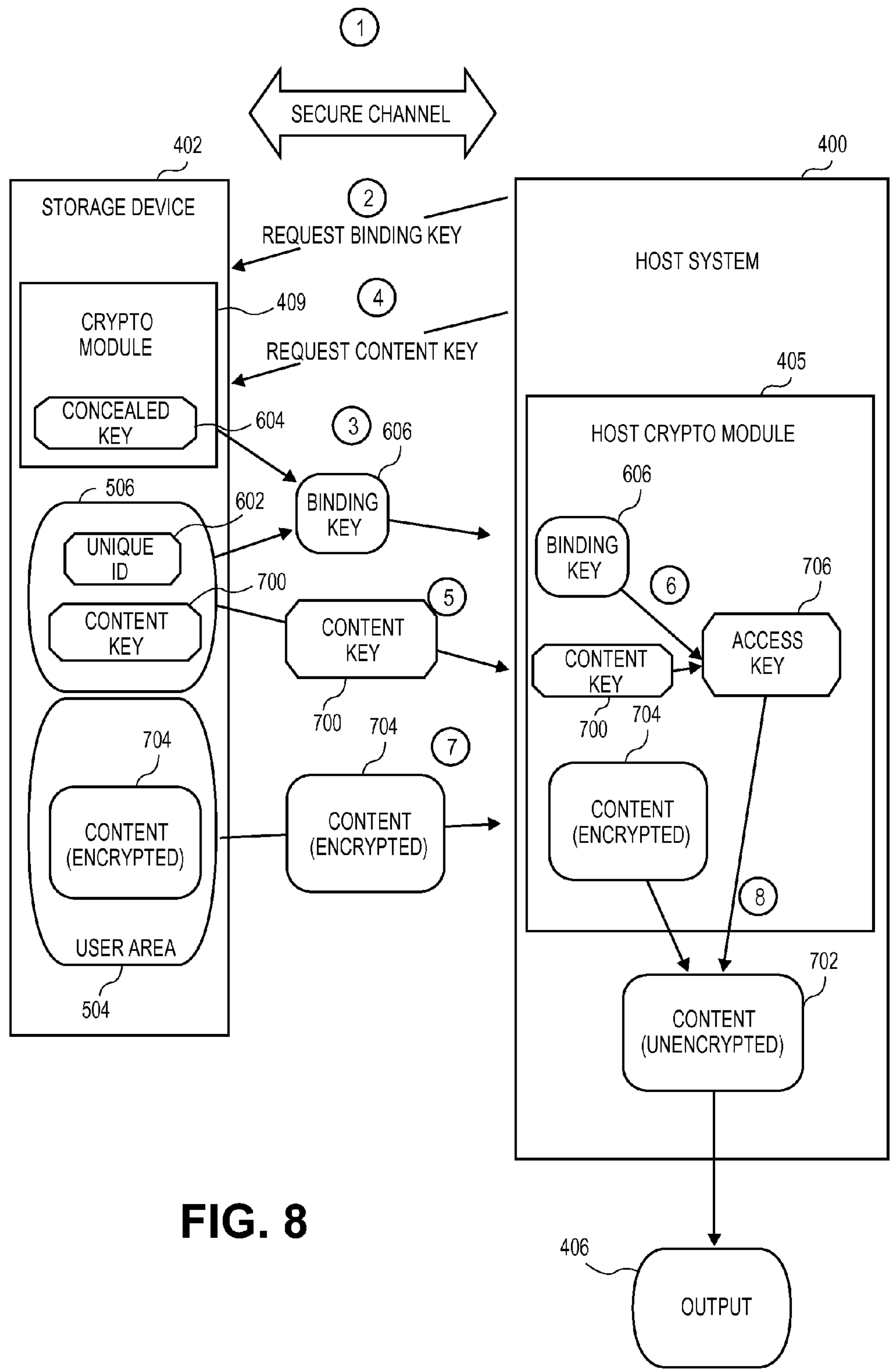
FIG. 8 illustrates an exemplary process flow for playing content according to one embodiment.

FIG. 8 illustrates an exemplary process flow for playing content. As shown, first, the host system 400 and the storage device 402 may establish a secure communication channel with each other. For purposes of brevity, an example of the establishment of a secure channel based on PKI was provided above with reference to FIG. 7. In one embodiment, the storage device 402 will evaluate content's digital certificate and the player certificate to determine eligibility of the player to receive the content and/or content metadata Second, the host system 400 requests the binding key 606 from the storage device 402 because it is absent from the content metadata. Of note, in one embodiment, the storage device 402 does not retain the binding key 606. In another embodiment, the host system 400 requests for the binding key 606 are specific to the content to be played. If needed, this feature allows, for example, the storage device 402 to employ different algorithms for generating the binding key 606. The algorithms used may depend on various criteria, such as the specific item of content, the type of content, source of the content, number of copies of the content, for recovery, theft detection, etc.

Accordingly, third, the storage device 402 ephemerally generates the binding key 606. In particular, as noted above, cryptographic module 409 generates the binding key 606 based on a cryptographic combination of the concealed key 604 and the unique identifier 602. Once generated, the storage device 402 may transmit the binding key 606 to the host system 400.

Fourth, the host system 400 requests the content key 700 from the storage device 402. In one embodiment, the content key 700 may be retrieved from the content metadata stored in non-user area 506 on storage device 402. The host system 400 may request the content key 700 based on a variety of parameters, such as a content identifier, and the like.

Fifth, the storage device 402 provides the content key 700 to the host system 400. For example, the storage device 402 may access the non-user area 506 and transmit the content key 700 to the host system 400. When retrieving the content key 700, the cryptographic module 409 may need to perform various cryptographic functions, such as decryption, checking of digital signatures, etc.

Sixth, the host system 400 generates the access key 706 in order to decrypt the content. In particular, the host's cryptographic module 405 generates the access key 706 based on a cryptographic combination of the binding key 606 and the content key 700. The cryptographic module 405 may be programmed with the unique algorithm that is known only within the cryptographic module 405 of the host system 400. For example, the cryptographic module 405 may comprise an OTP NVM that is programmed with the algorithm for generating the access key 706. This feature allows, among other things, the access key 706 to be substantially absent from the content metadata.

Seventh, the storage device 402 provides the encrypted content 704 to the host system 400. In one embodiment, the storage device 402 streams the encrypted content 704 to the host system 400.

Eighth, the host system 400 cryptographically processes the encrypted content 704 to recover the content 702 in unencrypted form. As noted, in one embodiment, content is encrypted based on symmetric cryptography, such as AES 128, using the access key 706. Once in decoded or unencrypted form, the host system 400 may then output the content 702 to an output 406. Of note, the host system 400 may re-encrypt the content for delivery to the output 406. For example, if the output 406 is a high definition multimedia interface ("HDMI") device, then host 400 may re-encrypt the content using High-bandwidth Digital Content Protection ("HDCP") encryption currently specified for HDMI devices and transmit the content in this secure form. In one embodiment, the host 400 may decrypt the content and then re-encrypt the content using a secure transport encryption protocol, such as high bandwidth content protocol (HDCP), and outputting the re-encrypted content to a display device, such as TV, a monitor, etc. In another embodiment, the host 400 decrypts the content, then re-encrypts the content using, for example, digital transmission content protection (DTCP), and sends the re-encrypted content to a playback device, such as a TV, a monitor, etc. Accordingly, in one embodiment, the content may always be in a secured form when in transit between entities of the system 100.

The features and attributes of the specific embodiments disclosed above may be combined in different ways to form additional embodiments, all of which fall within the scope of the present disclosure. For example, in the case of Network Attached Storage ("NAS"), the NAS storage may contain one or more storage devices and implement various technologies (like RAID), which result in content that may be spread across multiple storage devices. In the case of a NAS comprising a single drive, the NAS controller may be configured to bind the content to the storage device of the single drive in similar fashion described above. In the case of a NAS comprising multiple drives, the content may be bound to the NAS subsystem instead of or in addition to a specific storage device or storage medium. Accordingly, the NAS subsystem may contain a secure cryptographic module. In this variation of the embodiments, for a NAS storage, a unique set of keys may be generated by the NAS controller and securely stored in the secure storage of the NAS. Then, content binding to the NAS may be performed in similar fashion as described above. Thus, even if a clone copy of a drive is accomplished, this drive will not be usable unless it is installed into exactly the same NAS system. This method may be useful in enabling replacement of a damaged drive in a NAS RAID system, while ensuring that a cloned drive is not useful.

Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A storage device configured to provide content to a player system for rendering of the content, said storage device comprising:

a storage medium comprising a user area that is accessible by the player system and a non-user area that is not accessible by the player system; and a controller comprising a cryptographic module providing a hardware root of trust and a secured memory, wherein the controller is configured to:

authenticate the player system;

establish a secured communication channel with the player system based on the authentication;

provide, to the player system, a first cryptographic key, wherein the first cryptographic key is unique to the storage device, the first cryptographic key based at least partly on defect information of the storage medium and cryptographic data stored on the non-user area;

provide, to the player system, a second cryptographic key that is associated with the content, wherein the second cryptographic key is based at least partly on cryptographic data previously obtained, over a communication network, from an audit system distinct from the player system; and provide, to the player system, the content in encrypted form from the user area of the storage medium, wherein the content is accessible based on a cryptographic combination of the first cryptographic key and the second cryptographic key.

2. The storage device of claim 1, wherein the first cryptographic key is based on a key that is concealed in the storage device.

3. The storage device of claim 2, wherein the cryptographic module stores the concealed key in a one-time-programmable, non-volatile memory in the secured memory.

4. The storage device of claim 1, wherein the controller is configured to provide the first cryptographic key as an ephemeral key.

5. The storage device of claim 1, wherein the defect information comprises data on manufacturing defects of the storage medium.

6. The storage device of claim 1, wherein the storage medium comprises magnetic media.

7. A player system configured to play encrypted content, said system comprising:

a first interface configured to communicate with a storage device storing encrypted content; and a processor configured to:

authenticate the storage device;

establish a secured communication channel with the storage device via the first interface;

receive, from the storage device, a binding cryptographic key that is unique to the storage device, the binding cryptographic key based at least partly on defect information of a storage medium of the storage device;

receive, from the storage device, a second cryptographic key that is associated with the content, wherein the second cryptographic key is based at least partly on cryptographic data previously obtained, over a communication network, from an audit system distinct from the player system;

determine an access key for the content based on a cryptographic combination of the binding cryptographic key and the second cryptographic key;

receive, from the storage device, the encrypted content; and decrypt the content based on the access key.

8. The player system of claim 7, wherein the binding cryptographic key is based on a key that is concealed in the storage device.

9. The player system of claim 7, wherein the processor is configured to authenticate the storage device based on a public key infrastructure.

10. The player system of claim 7, wherein the processor is configured to mutually authenticate with the storage device based on a public key infrastructure.

11. The player system of claim 7, wherein the processor is configured to receive an ephemeral binding cryptographic key based on a request sent to the storage device.

12. The player system of claim 7, wherein the processor is configured to receive a temporary binding cryptographic key based on a request sent to the storage device.

13. The player system of claim 7, wherein the processor is configured to determine an ephemeral access key based on the cryptographic combination of the binding cryptographic key and the second cryptographic key.

14. The player system of claim 7, wherein the processor is configured to obtain a digital certificate for the content.

15. The player system of claim 14, wherein the processor is configured to determine authorization for access to the content based on the digital certificate and the authentication of the storage device.

16. The player system of claim 7, wherein the defect information comprises data on manufacturing defects of the storage medium.

17. A method of accessing encrypted content from a storage device, said method comprising:

receiving, from the storage device, a binding cryptographic key that binds the content to the storage device, the binding cryptographic key based at least partly on defect information of a storage medium of the storage device;

receiving, from the storage device, a second cryptographic key that is associated with the content, wherein the second cryptographic key is based at least partly on cryptographic data previously obtained, over a communication network, from an audit system distinct from a player system;

determining an access key for the content based on a cryptographic combination of the binding cryptographic key and the second cryptographic key;

receiving, from the storage device, the encrypted content; and decrypting the content based on the access key.

18. The method of claim 17, wherein the binding cryptographic key is based on a key that is concealed in the storage device.

19. The method of claim 17, wherein authenticating the storage device comprises mutually authenticating with the storage device based on a public key infrastructure.

20. The method of claim 17, wherein receiving the binding cryptographic key comprises receiving an ephemeral binding cryptographic key based on a request sent to the storage device.

21. The method of claim 17, wherein determining the access key comprises determining an ephemeral access key based on the cryptographic combination of the binding cryptographic key and the second cryptographic key.

22. The method of claim 17, wherein the defect information comprises manufacturing defects of the storage medium.

* * * * *